May 9, 1967

A. P. ADKINS 3,318,073

GRAVITY INSENSITIVE DEGASIFYING RESERVOIR

Original Filed Sept. 17, 1962

INVENTOR.
ASHLEY P. ADKINS
BY
Charles F. Dinkler
ATTORNEY

May 9, 1967  A. P. ADKINS  3,318,073
GRAVITY INSENSITIVE DEGASIFYING RESERVOIR
Original Filed Sept. 17, 1962  3 Sheets-Sheet 2

INVENTOR.
ASHLEY P. ADKINS
BY
Charles F. Diechler
ATTORNEY

INVENTOR.
ASHLEY P. ADKINS
BY
Charles F. Dischler
ATTORNEY

United States Patent Office 3,318,073
Patented May 9, 1967

3,318,073
GRAVITY INSENSITIVE DEGASIFYING RESERVOIR
Ashley P. Adkins, Santa Monica, Calif., assignor to North American Aviation, Inc.
Continuation of application Ser. No. 224,123, Sept. 17, 1962. This application July 9, 1965, Ser. No. 473,903
5 Claims. (Cl. 55—202)

This application is a continuation of Ser. No. 224,123, filed Sept. 17, 1962, and now abandoned.

This invention relates to an apparatus for separating gas-liquid mixtures into their component phases and, in particular, it relates to such an apparatus that is universally operable under any type of gravitational force, i.e., an apparatus that will separate a gas phase component from a gas-liquid mixture and deliver liquids substantially free of gas regardless of the attitude of the apparatus or whether the gravitational or inertial forces acting on the gas-liquid mixture are positive, negative, zero or transverse to the axis of the apparatus and its contained gas-liquid mixture.

Manned and unmanned space vehicles presently designed and those contemplated in the future pose the problem of providing operational fluid systems able to function for extended periods of time under conditions of zero gravitational force, as well as under positive, negative and transverse gravitational forces. Functional systems for space vehicles and the support equipment necessary to sustain life in such vehicles require the positive operation of all such systems regardless of the changing inertial forces imposed thereon. Typical of such systems are cryogenic systems containing liquefied gases such as liquid oxygen, nitrogen, helium and the like. It is obvious that fluid systems, i.e., any system utilizing or depending on a liquid or gas or a combination thereof for its functioning, will be particularly susceptible to gravitational changes and will present particularly difficult problems in the maintenance of design flow parameters as a result of such changes. This is especially true in liquid systems wherein the liquid has a surface in direct contact with a gas. This may occur as where a compressed gas is employed to pressurize a container to expel a liquid therefrom or in any other system wherein liquids may entrap or entrain air or gas during the normal functioning of the system.

The prior art approach for securing and/or maintaining the separation of liquids from gases under zero gravitational forces has been twofold. In some instances, such as where a volume of liquid is stored under the pressure of a driving gas, the liquid is separated from the gas by an impervious, flexible bladder or diaphragm or by a movable piston. The other approach, which is more adaptable to a continuous flow, reservoir-type system consists of inducing a directed inertial component into the movement of a gas-liquid mixture so that the differences in the gas and liquid densities result in different definable directions of movement of both the liquid and the gas. Some of the devices used in the second approach include paddle wheel arrangements to mechanically rotate the mass of liquid and gas within a stationary container, rotating containers in which the liquid, gas and container all move and simple vortex separators systems utilizing a separate recirculating system.

Although these continuous flow-type prior art systems are designed to operate adequately at zero "G," in addition to positive "G" operation, they have no capability for gas separation during transverse or negative gravity conditions. While the gas pressurized, separated member-type system is not thus restricted to positive and zero "G" operation, it possesses structural material limitations and pressurizing gas limitations when used to contain cryogenic liquids. For example, gaseous nitrogen cannot be used to pressurize liquid nitrogen because some gas will condense on the driving side of the separator and, conversely, gas will be generated on the liquid side by reason of the heat exchange between the two fluids. Such factors severely limit use of this type of system in space operations at the present time.

The present invention permits gas-liquid separation and substantially gas-free liquid withdrawal in a unique and more effective manner than was formerly possible. In accordance with my invention, the pressurized liquid, which either may be a recirculated liquid containing gas therein, or may be a stored volume of liquid subjected to a compressed pressurizing gas, is caused to pass from one successive chamber to another through tortuous arcuate channels positioned to set up a low velocity vortex action in each of the successive chambers. Passage of the gas phase of any gas-liquid mixture is hampered by the relatively restricted channels, the location of the channel inlets and the vortex action in each chamber which sets up an inertial field causing the heavier liquid to rotate at the outer edges of the vortex and the gas phase to be displaced to the center of the chamber. The swirl or vortex effect is primarily of use during zero gravitational force conditions, while the bubble flow resistance effect of the restricted channels and inlet locations are of particular importance during negative gravity conditions. In addition to these two flow mechanisms, the arcuate channels are configured to produce a siphon effect that is operable under transverse gravity conditions to transfer liquid from one chamber to another. More specifically, the present invention contemplates a container divided into a series of chambers by bulkheads or baffles. Associated with each baffle are a number of generally arcuate passageways or conduits located near the peripheral edge of the bulkhead and having their inlets on one side of the bulkhead and their outlets on the other. The inlet and outlet of each conduit is angularly displaced from the inlet and outlet of every other conduit on a particular bulkhead. Conduits may be formed integrally within the bulkhead or externally thereof but in close proximity thereto.

One specific embodiment lends itself to use as a liquid storage vessel wherein pressurization of the liquid is accomplished by means of a gaseous medium which cannot be physically separated from the liquid by means of an impermeable flexible diaphragm or a piston in order to separate the driving gas from the liquid. Such close association of a pressurizing gas and a liquid in a storage container occurs in tanks for storing cryogenic materials such as liquid nitrogen, oxygen, helium or hydrogen, since few, if any, materials are presently known which will maintain the requisite diaphragm reliability with regard to flexibility and sealing capability at the extreme low temperatures involved.

Other specific embodiments incorporate provisions for venting of the container and individual chambers formed therein whereby it may be utilized for a continuous or recirculating type flow system.

Accordingly, it is the primary object of this invention to provide an apparatus whereby a liquid contained therein, which itself either contains entrained gases or is pressurized by a gaseous medium in direct contact with such liquid, is delivered to the outlet regardless of the attitude of the apparatus and regardless of whether positive, zero, negative or transverse gravitational forces, or random combinations thereof, are acting on the apparatus and the liquid and gaseous media contained therein.

It is another object of this invention to provide a gas-liquid separator which operates by means of siphon, swirl and gas flow resistance effects to provide substantially gas-free liquid at the outlet regardless of variations in magnitude or direction of the gravity or inertia forces acting on the gas and liquid in the separator.

It is also an object of this invention to provide a gas-liquid separator which has no moving parts and which is particularly adapted for operation to deliver a steady flow of liquid under zero gravity conditions.

It is a further object of this invention to provide a gas pressurized reservoir for cryogenic liquids, wherein the pressurized driver gas is in direct contact with the liquid, which will deliver a steady flow of substantially gas-free cryogenic liquid under any gravity or inertia force condition.

It is a still further object of this invention to provide a gas-liquid separator comprising a series of successive compartments or chambers, each of which is interconnected to an adjoining chamber by a multiplicity of arcuate channels which produce a rotational effect of the fluid volume contained in each such successive chamber, provide siphons between adjoining chambers and provide resistance to the passage of gas bubbles from one chamber to another.

It is yet another object of this invention to provide a separator for a continuous recirculation fluid system that is capable of receiving a gas-liquid mixture and delivering substantially gas-free liquid under either positive, negative, transverse or zero gravitational force conditions or random combinations thereof.

These and other objects and advantages of the present invention will become apparent to those skilled in the art after reading the present specification and the accompanying drawings forming a part thereof, in which.

Figure 1:
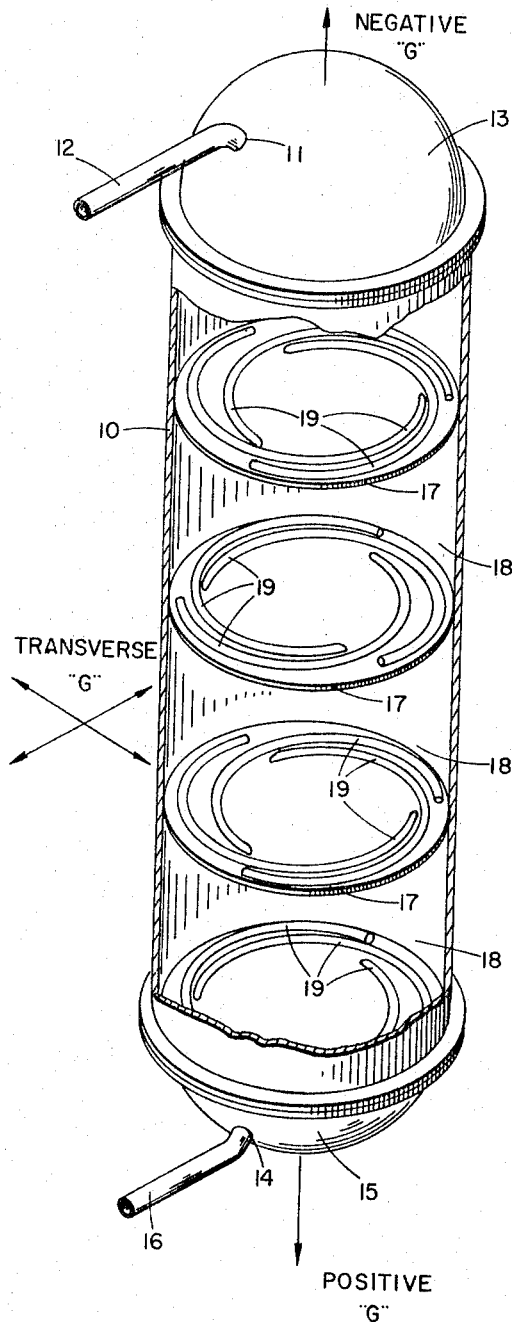
FIG. 1 is a cutaway view of a gas pressurized liquid storage tank incorporating means for impeding the migration of the gas in the tank toward the delivery port and for separating the gas from the liquid in accordance with the present invention.

Reference is first made to the gas pressurized storage tank embodiment of FIG. 1. In the present invention the mass of liquid and gas in the container is rotated by imparting a velocity to the stream of liquid in a predetermined direction as it flows from one compartment to another to provide controlled inertial separation of the gas and liquid phases. In this embodiment the gas pressure driving force used for expelling the tank liquid is also utilized to accomplish rotation. The column of liquid is divided into sections, each of which is rotated independently of the other, with rotation of each section being initiated at more than one location, to insure that there is no direct flow path from the gas inlet to the liquid outlet. In this embodiment no moving parts are required to effect the desired result. For normal positive "G" operation and for operation in a weightless or zero "G" condition, the swirl or vortex separation effect is sufficient to provide a steady predetermined flow quantity at the outlet that is substantially gas-free. However, for operation wherein transverse or negative "G" forces are introduced, the swirl effect alone is insufficient to deliver a steady flow of gas-free liquid at the tank outlet. Operation under transverse "G" forces is obtained in the present invention by the provision of a particular conduit arrangement which interconnects adjoining liquid sections in a manner such that siphon effects are introduced. The siphon forces are effective to successively transfer liquid from one compartment to another during transverse gravity conditions. The resistance or attenuation effect offered by the liquid conduits and their entrances and exists to the passage of gas introduces a high impedance to gas migration therethrough during negative "G" operation. Thus, effective universal operation of the separating device of the present invention is obtained under positive, negative, zero and transverse "G" forces by means of a unique baffle and conduit arrangement which impedes the migration of any gas toward the liquid outlet port while effectively passing liquid through the device to the outlet. The device is capable of intermittent operation and of maintaining inertial separation even though liquid is not being continuously withdrawn due to the inertia of the rotating mass in each compartment.

Figure 3:
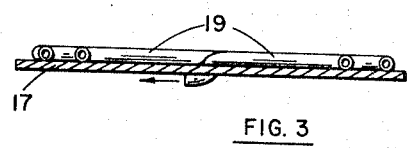
FIG. 3 is a sectional view of one of the bulkheads of the separating tank taken in the plane of line 3—3 in FIG. 2.

As shown in FIG. 1, the gas pressurized storage-type embodiment of the invention includes a tank 10 having a pressurizing gas inlet 11 connected to a high pressure gas line 12 in upper hemispherical dome end 13. A fluid outlet port 14 formed in lower dome 15 connects to a fluid outlet line 16. Vertical orientation of the longitudinally extending device is normally utilized to achieve maximum delivery unless the device is operating in a continuous zero "G" field. In the latter event effective operation is feasible in any attitude. Axially spaced within the tank and extending transverse to the longitudinal axis thereof are a series of imperforate bulkheads or baffles 17 for dividing the tank into separation compartments 18. To provide fluid access between successive compartments and to achieve the unique effects of the present invention, a series of conduits or passageways 19 are formed through the bulkheads. These conduits may either be formed integrally within the baffle, provided it has sufficient depth, or, as shown in FIGS. 1 and 3, tubes may be attached to the top of the baffle as by welding. Each tube then has its open inlet end at the upper surface of the bulkhead and its outlet end opening into the next adjacent compartment beneath the bulkhead. The tubes are preferably formed into a 240° circular arc near the periphery of the bulkhead. Thus, any fluid moving from one compartment to the next must enter one of these conduits or tubes 19 and move through 240° of arc before exiting. The tangential velocity of the fluid leaving the conduits maintains the rotation of the fluid mass in each successive compartment. As illustrated and described herein, three such arcuate conduits are provided at each baffle, with the inlets and outlets of the three tubes being spaced at substantially 120° intervals, respectively. The number of conduits or the spacing of the inlets and outlets does not materially affect the operation of the tank except for the total amount of liquid delivered under transverse gravity conditions. However, it has been found that the best operational results at zero and negative "G" are obtained by having the entrance to the conduits at the extreme outside diameter of the ring of multiple conduits and the exit to the lower compartment at the inside of such ring. By collecting liquid from a point further from the center and discharging it closer to the center, the angular acceleration in the next compartment is thus increased. As a general rule, the arcuate passage length should preferably be approximately 360° minus the arcuate length between the inlets.

Imparting a rotational "G" force to the fluid mass provides a means for separating the gas and liquid phases during positive and zero "G" operation. Such rotation could be achieved with relatively short conduits interconnecting the adjoining compartments. However, something more is needed to provide operating capability under transverse or negative "G" forces. The ability of the present system to operate in a transverse gravity field stems from the relatively long arc length of the conduits connecting the adjacent compartments. The illustrated device with three conduits spaced 120° apart and having a 240° arc length serve as siphons whereby, as may be readily calculated, 75% to 90% of the liquid may be transferred from one compartment to the next compartment, depending on the precise placement of the tubing inlets in relation to the transverse "G" field. Orientation of the inlets and outlets is thus preferably staggered or varied from bulkhead to bulkhead to improve the average delivery under transverse "G" conditions.

The efficacy of the present invention in negative "G" operation results from the trapping or impedance effect of the arcuate lengths and entrances and exits of the small diameter conduits at each bulkhead. The delivery of gas-free liquid to the outlet port is a time dependent relationship with gas eventually passing through to the outlet port if negative "G" operation continues for a sufficient time interval. The time delay for occurrence of gas penetration from compartment to compartment is dependent on the gas bubble restriction or impedance characteristics due to the placement of the fluid passages and the ability to store some gas at each bulkhead as by the trapping effect of the circle of tubing on the upper surface of the bulkhead. These time delay and percentage amount of fluid delivered factors can be altered through variations of design details, such as by utilizing traps or by changing the number of bulkheads, the conduit size or the inlet configuration.

A particular application of the present invention, as embodied in FIG. 1, resides in its use as a cryogenic reservoir for air conditioning and pressurization systems of advanced experimental aircraft. In this particular system the reservoir is insulated and contains liquid nitrogen under a pressure of 65 p.s.i.g. The pressurizing force is normally attained by means of helium gas contained in the upper dome 13 but may also be accomplished by pressure build-up due to evaporation of the liquid nitrogen. A satisfactory specific construction used for the stated purpose comprises a tank 37¼" high divided into six compartments by five baffles with a diameter of 15 13/16". The tank has a capacity of 180 lbs. of liquid nitrogen or approximately 30 lbs. per compartment, with a design flow rate of 5 lbs. per minute through three tubes having ½" diameter x .035" wall thickness dimensions and a 240° arc length. For the preceding parameters it can be shown that a rotational field of approximately 0.02 "G" results at the outer edge of the mass in each compartment, decreasing as the center of the compartment is approached. For the stated flow rate, the liquid in a compartment will effectively be changed every six minutes. If a particle is considered not to move from the radius on which it entered, but moves toward the exit as previously supplied liquid is removed from the compartment, then the particle is in the compartment six minutes and will travel a distance of 199' at a velocity of 6.62" per second. When a bubble enters a compartment, it is acted on by a buoyant force equal to the difference between the "weight" of the liquid and the "weight" of the bubble. The acceleration force acting on a half inch bubble of nitrogen under these conditions can be readily computed as being 24.1 ft. per sec.², while on a one-half inch helium bubble it is 172.2 ft. per sec.². Calculations show that a one-half inch to one inch bubble of a gas such as helium or nitrogen will move to the center of such a rotating mass in from 2.5 to 4.2 seconds. Considering the average path length of a particle before entering and leaving, it is clear that enough time elapses to allow any entering gas bubbles of any appreciable size to move to the center of the mass under the influence of the small but finite gravitational field induced in the mass by rotation. Such inward movement is opposite to the direction of flow necessary to exit the compartment. Thus, each compartment independently serves to prevent any entering gas bubble from leaving and the sequence of compartments provides successive barriers against further gas penetration. For the present system it has been experimentally determined that the time delay for each compartment that is filled with liquid prior to starting of negative "G" conditions is in the range from 23.5 to 27 seconds. For the five bulkhead tank described above, this is sufficient to provide approximately two minutes of operation under negative "G" conditions for an initially full tank, whereas design requirements for such operation are normally limited to a fraction of a minute.

Some additional requirements for a practical embodiment of the invention concern its ability to be filled and to deliver substantially its entire capacity as needed. These include the necessity for using a flat baffle to prevent trapping of a gas bubble on the lower side of the baffle when the tank is filled from the bottom, as it must be in the embodiment of FIGS. 1–3, and to prevent the trapping of liquid on the upper side when the tank is being emptied. Also, under certain conditions of high delivery rate, with some gas in the lower compartment and the outlet in the center of the bottom dome, a vortex tends to be created in the lower compartment which may deliver some gas out the exit simultaneously with the liquid. For this reason it is preferable that the outlet be off-center at approximately at 45° position. This will also improve zero "G" performance when a gas bubble reaches the lower compartment.

Figure 2:
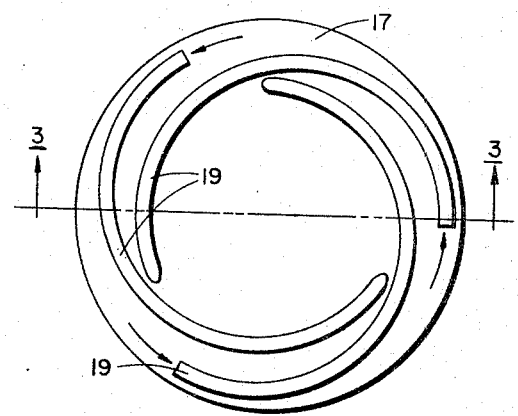
FIG. 2 is a top plan view of a tank baffle taken in the plane of line 2—2 in FIG. 1.
Figures 4, 8:
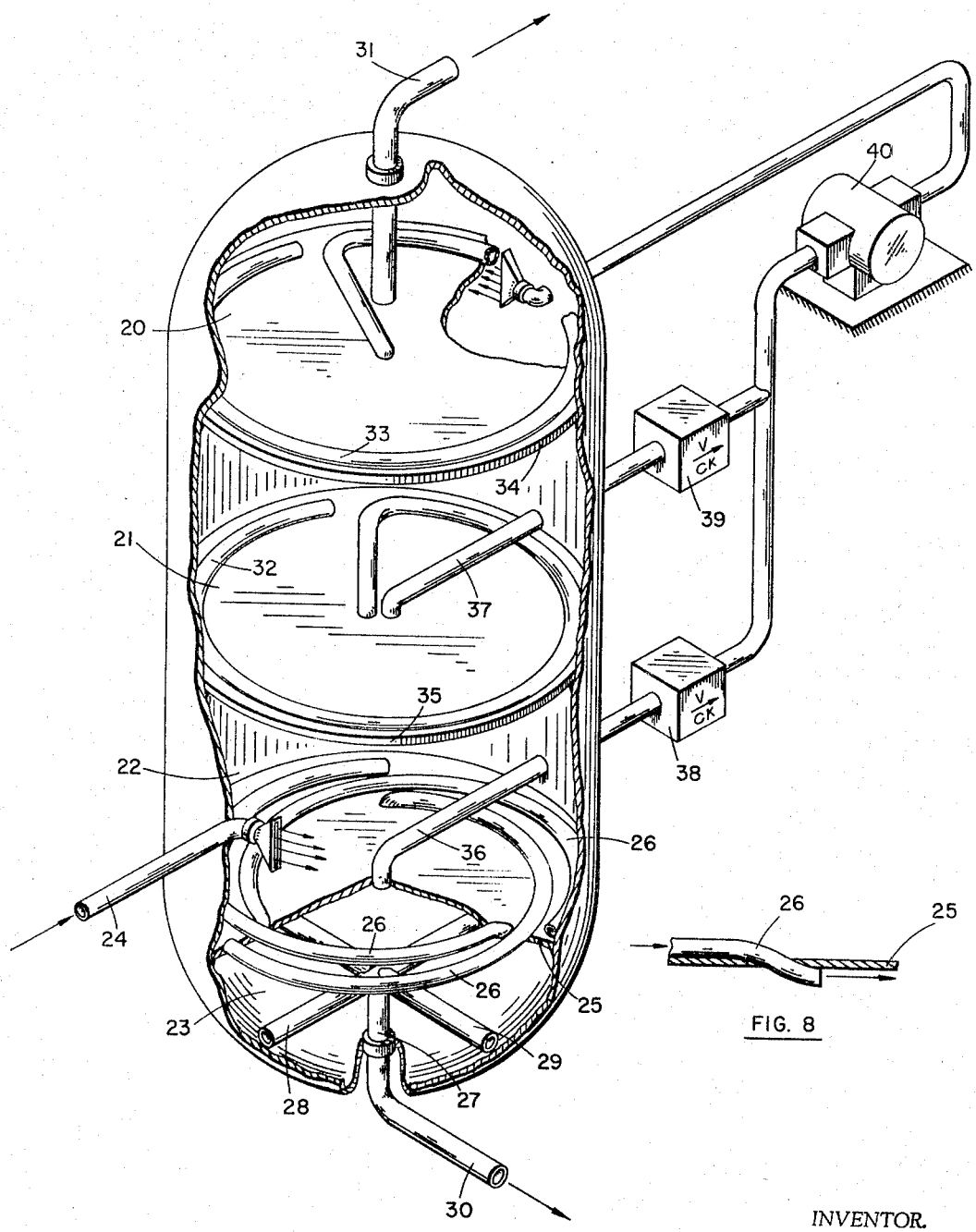
FIG. 4 is a cutaway view of another embodiment of the invention adapted for use in a recirculating or continuous flow-type system.
FIG. 8 is an enlarged view illustrating that the conduits, in discharging fluids into the next succeeding compartment, impart a directed velocity component to the fluid in such compartment to produce rotation.

The same principles that are used in the gas pressurized type storage reservoir of FIGS. 1–3 can be utilized in a reservoir for a continuous recirculation system wherein the fluid entraps and absorbs gas during its use cycle and is returned to the reservoir in a condition where it contains a significant amount of gas which must be removed prior to recirculation of the liquid. FIG. 4 illustrates a reservoir in accordance with the present invention for such a recirculation type flow system. By means of appropriate baffles the separating reservoir is divided into four distinct categories of compartments or chambers, including a vent chamber 20, expansion chamber 21, separation chamber 22 and delivery chamber 23. The gas and liquid mixture enters separating chamber 22 thru return line 24 which is terminated within chamber 22 in a manner to induce a tangential flow of the entering fluid mixture and produce rotation of the fluid mass within the chamber. Baffle 25 divides separation chamber 22 from the next lower chamber which is the delivery chamber 23. Baffle 25 includes three 240° arc length circular conduits 26 for transferring fluid from the separation chamber to the delivery chamber in a manner similar to that disclosed above for the gas pressurized embodiment of FIGS. 1–3.

Rotation of the fluid mass in separating chamber 22 tends to displace the lighter gas to the center of rotation so that a substantial percentage of gas-free liquid is delivered through conduits 26 into delivery chamber 23. This chamber is similar to separation chamber 22 in that swirl effects from the inlet are used to further separate liquid from the gas. In addition, however, this chamber contains an outlet 27 to deliver separated liquid into the recirculation system. This outlet may be a simple 45° off-center tank outlet as previously described but, in its preferred form, outlet 27 has its suction end at a location where it is least likely to be exposed regardless of the direction of any absolute "G" force, as well as under zero "G" operating conditions. Since such an optimum inlet location is not universally definable, a multiple entry outlet system is used. In this arrangement two or more tubes 28 and 29, respectively, are formed as a cross so that their open outer ends form inlets near the outer edge of the rotating liquid mass. The plane of the tubes is generally coincident with the transverse plane of the center of gravity of the delivery chamber under normal "G" conditions and their intersection and connection with the delivery tube 30 is located at the center of gravity of the delivery chamber.

Fluid systems operating through a considerable temperature range suffer a change in the fluid volume due to fluid expansion at the high temperature. Thus, adequate ullage space must be designed into the present reservoir to contain this additional fluid volume or it will be lost by discharge outside of the system. This volume requirement is incorporated into this reservoir by means of an expansion chamber 21 which impedes the expansion of the liquid into vent chamber 20 from whence it could overflow out vent line 31. Expansion liquid has access from separating chamber 22 into expansion chamber 21 thru a conduit 32 which has its entrance at the top center portion of chamber 22 and is formed into a 360° anti-siphon loop at the outer periphery of chamber 21 before discharging into the expansion chamber. A similar tube 33 at baffle 34 connects the expansion chamber 21 with the vent chamber 20. This chamber provides a vent volume to minimize random loss of fluid due to sloshing. Vent line 31 preferably has its inlet opening located at the center of gravity of the vent chamber.

Since the system of this embodiment is to be continuously operable, it is necessary to provide a means for removing any gas that may collect in the separation or delivery chambers in order to prevent a gas build-up in one or more of such chambers. The system illustrated in FIG. 4 essentially comprises a pump and check valve arrangement for evacuating the gas or gas and liquid mixture from the top of the separation and delivery chambers. Conduits 36 and 37 have their inlet ends terminating at the underside of the baffles 25 and 35 which form the upper surfaces of delivery chamber 23 and separation chamber 22, respectively. Check valves 38 and 39 prevent reverse flow into such chambers. Conduits 36 and 37 connect to the suction side of a low pressure pump 40 which discharges tangentially into expansion chamber 21 to assist in producing a rotational effect of any fluid mass therein. From this chamber the liquid flows through arcuate conduit 32 into the separation chamber 22, while the gas flows through tube 33 into the vent chamber 20 and thence out vent line 31. Operation of the pump system would only be intermittent as required and only when the "G" direction is normal and positive. The pump may be cycled manually at appropriate intervals or automatically in response to a "G" sensing device.

Figures 5, 6:
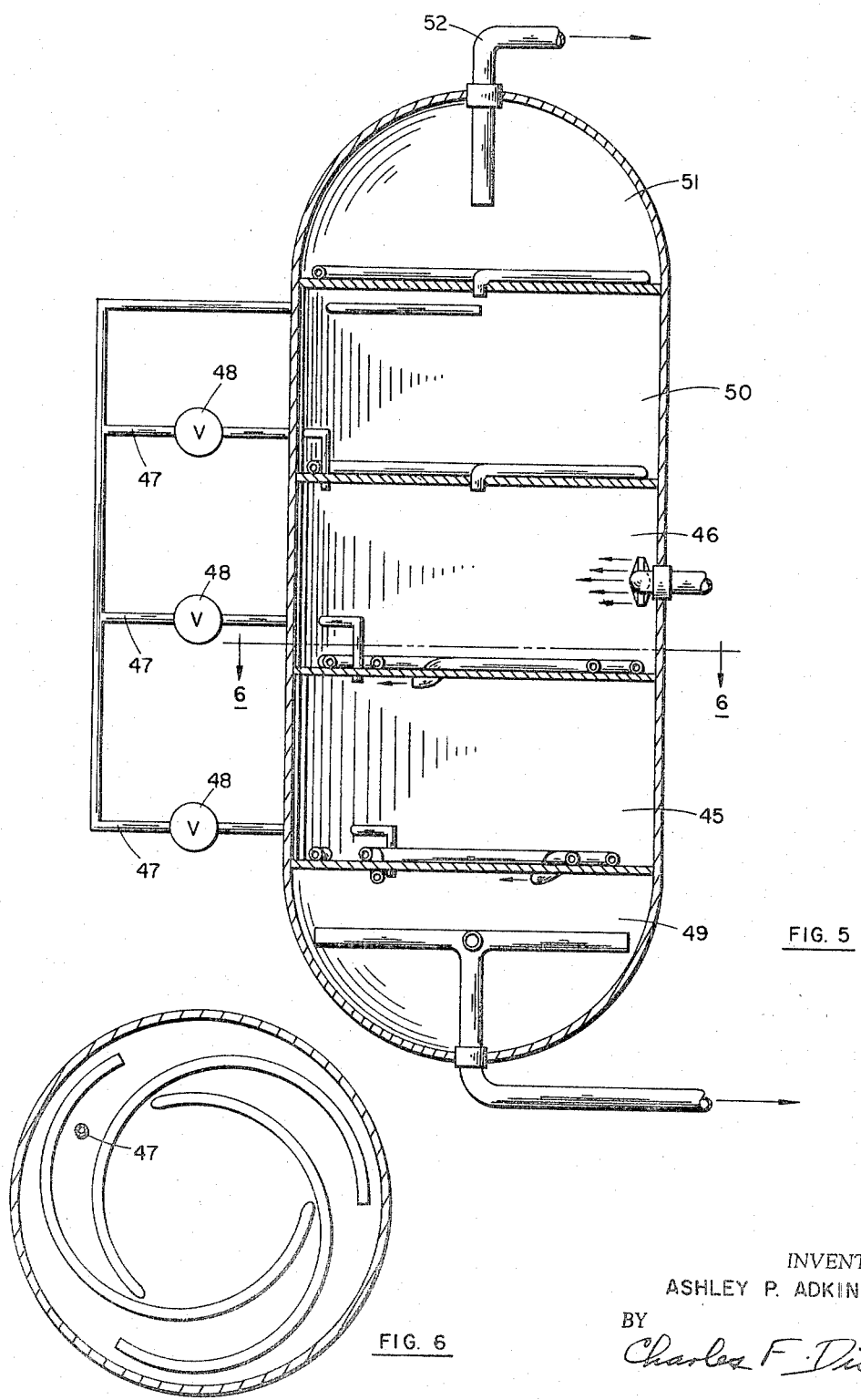
FIG. 5 is a sectional view of still another embodiment of a separating reservoir in accordance with the present invention for use in a continuous flow, recirculating system.
FIG. 6 is a sectional view taken in the plane of line 6—6 in FIG. 5.

More than one separation chamber may be necessary depending on the design requirements as to direction of "G" and length of time at a particular "G." Such multiple separation chambers would be in series with the outlet of one comprising the inlet of the next successive lower chamber. These outlets and inlets would preferably comprise at least three conduits of 240° arcuate length, as previously described. Such a modified arrangement for continuous flow operation is shown in FIG. 5 having two separation chambers 45 and 46. This embodiment has a modified gas removal system consisting of separate vent tubes 47, with valves 48 therein providing venting operation, connecting each of separation chamber 45 and 46 and the delivery chamber 49 with the expansion chamber 50. Valves 48 may be of a solenoid type controlled by an appropriate "G" sensor. Gas accumulated at the top of either separation chamber or the delivery chamber will flow through tubes 47 into the expansion chamber and thence into vent chamber 51 and out vent line 52. Operation of this gas removal system would be infrequent and only when the "G" direction is positive and vertical. Under many conditions the duration of flight will be insufficient to call for elaborate venting arrangements or possibly even for any venting device. However, if venting is required, it may be performed manually at predetermined intervals or by means of one of the arrangements illustrated in FIGS. 4 and 5. Operation of either of the gas removal systems described herein can be effected whether or not the main circulating system is operating.

From the above description it will be readily seen that the reservoirs of either FIG. 4 or FIG. 5 are capable of continuously accepting a mixture of liquid and gas and separating them, with substantially only liquid leaving the reservoir, regardless of the direction of the "G" force or whether the "G" force is zero. The length of time at negative "G," however, is a function of the design, as previously discussed.

The essential operation of this device under zero "G" conditions is based on compartmentation, pressurization of the liquid-gas mixture and the use of arcuate conduits between compartments for inducing an inertial field in each chamber without any necessity for moving internal hardware. For zero "G" alone, or in conjunction with certain specified other "G" directions, the relatively long arcuate tubes having an arc length of 240° are not necessary or required. Thus, under certain conditions shorter tubes could be utilized which would still maintain the rotation in the lower compartments in zero "G" operation. Such a design, however, would not be of universal application in handling "G" fields in random directions as are the other embodiments discussed above, i.e., it would not be operable under transverse "G" conditions of operation.

Figure 7:
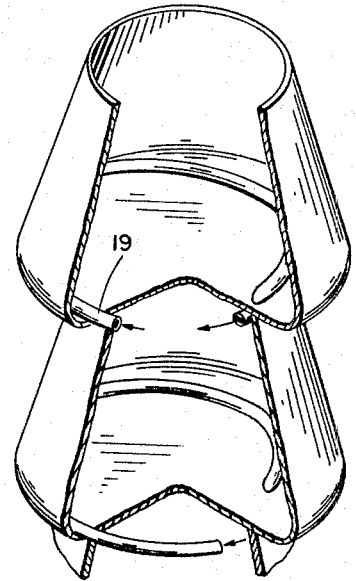
FIG. 7 is a perspective view of a compartment contoured in accordance with the present invention for maximum effectiveness during zero "G" operating conditions.

Chamber contouring may be advantageously used where prolonged or sustained operation at zero "G" is required. FIG. 7 illustrates how such contouring may be used to achieve maximum delivery of liquid from the individual compartments by placing the conduit inlet in the effective "low" position for zero "G" wherein it is covered by liquid in a nearly empty condition so as to drain the compartment to the maximum extent. The single conduit, shown in each compartment by way of illustration, is arranged to induce clockwise rotation in the next succeeding chamber. This is contrary to the rotational direction of the other embodiments and illustrates that the direction of rotation of the fluid is of no particular significance in the present invention.

While particular embodiments of this invention have been illustrated and described herein, it will be apparent that various changes and modifications may be made in the construction and arrangement without departing from the spirit and scope of this invention in its broader aspects, or as defined in the following claims.

I claim:
1. A separating reservoir adapted to receive and contain under pressure gas, liquid and a mixture thereof and to deliver substantially gas-free liquid independently of any gravitational and inertial forces acting thereon comprising a tank having fluid inlet and outlet means; means for dividing said tank into at least a first and second closed chamber; and means for providing fluid communication between said chambers through a restricted arcuate path passing through said dividing means and oriented to discharge fluid from said first chamber into said second chamber with a tangential flow component whereby a fluid induced vortex is generated in said second chamber, said restricted arcuate path being adapted to transmit liquid into said second chamber from said first chamber by siphon effects, said fluid communication means comprising a plurality of arcuate conduits each extending through an arc of at least 180°, with each said conduit having its inlet adjacent the tank wall and its outlet located radially inwardly of its outlet.

2. A separating reservoir as set forth in claim 1 wherein said fluid communication means comprises at least three restricted diameter arcuate conduits extending through an arc of 240° and having their respective outlet ends spaced 120° apart.

3. A separating reservoir adapted to receive gas, liquid and a mixture thereof and to deliver substantially gas-free liquid independently of gravitational and inertial forces comprising a container having fluid inlet and outlet means; baffles dividing at least a portion of said container into a series of successive closed separating chambers, each of said baffles having operatively associated therewith a series of arcuate conduits interconnecting adjacent chambers; each said series of conduits comprising individual conduits having inlets located at the upper surface of the associated baffle equiangularly spaced around the periphery of said baffle and outlets located below the associated baffle oriented to discharge with a tangential flow component, said conduits having an arcuate length of 360° minus the arcuate spacing between adjacent conduit inlets.

4. A separating reservoir as set forth in claim 3 and further including means for venting each of said separating chambers.

5. A gravity insensitive reservoir adapted to receive and store a liquid and a pressurizing gas which is in contact with the surface of said liquid comprising a container having a liquid outlet at its lower end and a pressurizing gas inlet at its upper end; baffle means dividing said container into a plurality of closed chambers, said baffle means including relatively restricted arcuate passageways of at least 180° arc length interconnecting adjacent ones of said chambers and oriented to discharge liquid from one of said chambers into a next adjacent chamber with a tangential flow component, said arcuate passageways having their openings equiangularly spaced around the periphery of said baffle means and having an arcuate length of 360° minus the arcuate spacing between the conduit inlets.

References Cited by the Examiner

UNITED STATES PATENTS 2,838,178   6/1958   Bankes _____ 210—170
3,209,518   10/1965  Spulgis et al. _____ 55—409

OTHER REFERENCES

Goddard et al., Rocket Development, Prentice Hall, N.J., 1961 (between 128 and 129), 188, 189.

Li, Ta, Hydrostatics in Various Gravitational Fields, Journal of Chemical Physics, vol. 36, pp. 2369–2375 (5–62).

Li, Ta, Liquid Behavior in a Zero–G Field, Institute of the Aerospace Sciences, paper 61–20.

REUBEN FRIEDMAN, *Primary Examiner.*

C. N. HART, *Assistant Examiner.*